United States Patent
Lee et al.

(10) Patent No.: US 10,436,960 B2
(45) Date of Patent: *Oct. 8, 2019

(54) METHODS FOR MANUFACTURING POLARIZING ELEMENT, POLARIZING ELEMENT ROLL AND SINGLE SHEET TYPE POLARIZING ELEMENT HAVING LOCAL BLEACHING AREAS

(71) Applicant: LG CHEM, LTD., Seoul (KR)

(72) Inventors: Beom Seok Lee, Daejeon (KR); Eung Jin Jang, Daejeon (KR); Kyun Il Rah, Daejeon (KR); Hyung Koo Kang, Daejeon (KR); Byung Sun Lee, Daejeon (KR); Du Jin Choi, Daejeon (KR); Ho Jeong Yun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 15/039,709

(22) PCT Filed: Mar. 25, 2015

(86) PCT No.: PCT/KR2015/002935
§ 371 (c)(1),
(2) Date: May 26, 2016

(87) PCT Pub. No.: WO2015/147551
PCT Pub. Date: Oct. 1, 2015

(65) Prior Publication Data
US 2016/0377777 A1    Dec. 29, 2016

(30) Foreign Application Priority Data
Mar. 26, 2014    (KR) .................... 10-2014-0035619

(51) Int. Cl.
*B29D 11/00* (2006.01)
*G02B 5/30* (2006.01)
(Continued)

(52) U.S. Cl.
CPC ............ *G02B 5/3033* (2013.01); *B23K 26/38* (2013.01); *B23K 26/402* (2013.01);
(Continued)

(58) Field of Classification Search
CPC .......... G02B 5/3033; G02B 1/10; G02B 1/14; B29D 11/00644; B29D 11/00865; B23K 26/38; B23K 26/402
See application file for complete search history.

(56) References Cited

U.S. PATENT DOCUMENTS 2,445,581 A    7/1948    Land
4,181,756 A *  1/1980    Fergason .......... G02F 1/133528
                                                       349/187
(Continued)

FOREIGN PATENT DOCUMENTS

EP    1555549 A2    7/2005
EP    2426522 A1    3/2012
(Continued)

OTHER PUBLICATIONS

Office Action of Japanese Patent Office in Appl'n No. 2016-533595, dated May 9, 2017.
(Continued)

*Primary Examiner* — Mathieu D Vargot
(74) *Attorney, Agent, or Firm* — Dentons US LLP

(57) ABSTRACT

The present invention relates to a method for manufacturing a polarizing element including locally bleached areas including steps of providing a polarizing element including a polyvinyl alcohol-based polarizer in which at least one or more of iodine and dichroic dye is oriented in a certain
(Continued)

direction; partially bleaching the polyvinyl alcohol-based polarizer by bringing a bleaching solution into contact with one surface of the polyvinyl alcohol-based polarizer through a printing method; and correcting an appearance of the partially bleached polarizing element.

12 Claims, 9 Drawing Sheets

(51) Int. Cl.
    *G02B 1/10* (2015.01)
    *G02B 1/14* (2015.01)
    *B23K 26/38* (2014.01)
    *B23K 26/402* (2014.01)
    *B23K 103/00* (2006.01)
    *B29K 29/00* (2006.01)

(52) U.S. Cl.
    CPC .. *B29D 11/00644* (2013.01); *B29D 11/00865* (2013.01); *G02B 1/10* (2013.01); *G02B 1/14* (2015.01); *B23K 2103/42* (2018.08); *B23K 2103/50* (2018.08); *B29K 2029/04* (2013.01)

(56) References Cited

U.S. PATENT DOCUMENTS

| | | | |
|---|---|---|---|
| 4,396,646 A * | 8/1983 | Schuler | G02B 5/3033 |
| | | | 264/1.34 |
| 4,420,552 A | 12/1983 | Peck et al. | |
| 4,466,704 A | 8/1984 | Schuler et al. | |
| 5,327,285 A | 7/1994 | Faris | |
| 5,537,144 A | 7/1996 | Faris | |
| 8,426,632 B2 | 4/2013 | Tanaka et al. | |
| 2007/0141244 A1 * | 6/2007 | Bell | C08J 7/04 |
| | | | 427/163.1 |
| 2008/0192345 A1 | 8/2008 | Mochizuki et al. | |
| 2008/0225210 A1 | 9/2008 | Shimoda et al. | |
| 2009/0086130 A1 | 4/2009 | Oikawa et al. | |
| 2010/0314032 A1 | 12/2010 | Kumagai et al. | |
| 2011/0273646 A1 | 11/2011 | Fukagawa et al. | |
| 2012/0067506 A1 * | 3/2012 | Tan | B29C 35/041 |
| | | | 156/83 |
| 2012/0106063 A1 | 5/2012 | Mathew et al. | |
| 2013/0044282 A1 * | 2/2013 | Kuwabara | G02F 1/1333 |
| | | | 349/96 |
| 2013/0149546 A1 | 6/2013 | Mori et al. | |
| 2014/0044947 A1 | 2/2014 | Sawada et al. | |
| 2015/0131035 A1 * | 5/2015 | Chen | G02B 5/305 |
| | | | 349/96 |
| 2015/0146294 A1 | 5/2015 | Watanabe | |
| 2015/0160390 A1 | 6/2015 | Goyal et al. | |
| 2015/0316696 A1 | 11/2015 | Kamijo et al. | |
| 2016/0202403 A1 | 7/2016 | Mathew et al. | |
| 2016/0299271 A1 | 10/2016 | Lee et al. | |
| 2016/0377777 A1 | 12/2016 | Lee et al. | |
| 2017/0045656 A1 | 2/2017 | Ogomi et al. | |

FOREIGN PATENT DOCUMENTS

| | | |
|---|---|---|
| EP | 2447766 A1 | 5/2012 |
| EP | 2735600 A1 | 5/2014 |
| JP | 58-062381 A | 4/1983 |
| JP | 58062381 U1 | 4/1983 |
| JP | 58-065076 A | 5/1983 |
| JP | 58-168020 A | 10/1983 |
| JP | 6036563 B2 | 8/1985 |
| JP | 63-21990 A | 1/1988 |
| JP | 63-265203 A | 11/1988 |
| JP | 095519 A | 1/1997 |
| JP | 2002258051 A | 9/2002 |
| JP | 2002-350638 A | 12/2002 |
| JP | 2005-084506 A | 3/2005 |
| JP | 2005266502 A | 9/2005 |
| JP | 2006-058838 A | 3/2006 |
| JP | 2009-048179 A | 3/2009 |
| JP | 2009-098636 A | 5/2009 |
| JP | 2010-001422 A | 1/2010 |
| JP | 2010-189814 A | 9/2010 |
| JP | 2011145675 A | 7/2011 |
| JP | 2011-257756 A | 12/2011 |
| JP | 2012-126127 A | 7/2012 |
| JP | 2012-137738 A | 7/2012 |
| JP | 2013-063666 A | 4/2013 |
| JP | 2013137551 A | 7/2013 |
| JP | 2014-037523 A | 2/2014 |
| JP | 2015-534100 A | 11/2015 |
| JP | 2015-215608 A | 12/2015 |
| JP | 2016-027135 A | 2/2016 |
| KR | 10-2003-0030313 A | 4/2003 |
| KR | 10-2010-0007272 A | 1/2010 |
| KR | 10-2010-0055442 A | 5/2010 |
| KR | 10-2010-0087837 A | 8/2010 |
| KR | 10-2010-0125537 A | 12/2010 |
| KR | 10-2010-0125558 A | 12/2010 |
| KR | 1020100125558 A | 12/2010 |
| KR | 10-2011-0115728 A | 10/2011 |
| KR | 1020110115728 A | 10/2011 |
| KR | 10-2012-0046035 A | 5/2012 |
| KR | 1020120046035 A | 5/2012 |
| KR | 10-2013-0080869 A | 7/2013 |
| TW | 200700780 A | 1/2007 |
| TW | 201224716 A1 | 6/2012 |
| WO | 2012/058525 A1 | 5/2012 |
| WO | 2014/031726 A1 | 2/2014 |
| WO | 2014123184 A1 | 8/2014 |

OTHER PUBLICATIONS

Office Action of Japanese Patent Office in Appl'n No. 2016-534722, dated May 9, 2017.

Office Action of Japanese Patent Office in Appl'n No. 2016-534992, dated May 9, 2017.

* cited by examiner

METHODS FOR MANUFACTURING POLARIZING ELEMENT, POLARIZING ELEMENT ROLL AND SINGLE SHEET TYPE POLARIZING ELEMENT HAVING LOCAL BLEACHING AREAS

This application is a National Stage Entry of International Application No. PCT/KR2015/002935, filed on Mar. 25, 2015, and claims the benefit of and priority to Korean Application No. 10-2014-0035619, filed on Mar. 26, 2014, Korean Patent Application No. 10-2014-0035614, filed on Mar. 26, 2014, and Korean Patent Application No. 10-2014-0080491, filed on Jun. 30, 2014, all of which are incorporated herein by reference in their entirety for all purposes as if fully set forth herein.

TECHNICAL FIELD

The present invention relates to methods for manufacturing a polarizing element, a polarizing element roll and a single sheet-type polarizing element, and in particular, to a method for manufacturing a polarizing element including locally bleached areas for performing functions such as installing components or developing colors and the like, and methods for manufacturing a polarizing element roll and a single sheet-type polarizing element.

BACKGROUND ART

Polarizing plates have been used in various display devices such as liquid crystal display devices and organic light emitting diodes. Most polarizing plates currently used are used in a form of dyeing iodine and/or dichroic dye on a polyvinyl alcohol (hereinafter, PVA)-based film, crosslinking the iodine and/or dichroic dye using boric acid and the like, and orienting the result using a method of elongation to prepare a Polarizer, and laminating a protective film on one surface or both surfaces of the prepared Polarizer.

Meanwhile, recent display devices tend to be slimmer, and a thickness of a bezel unit, in which a screen is not displayed, and an edge thickness tend to be minimized in order to obtain a large screen. In addition, components such as a camera tend to be installed in a display device in order to exhibit various functions, and attempts to provide various colors in a product logo or an edge area have been tried considering design factors.

However, in an existing polarizing plate, the whole area of the polarizing plate is dyed with iodine and/or dichroic dye, therefore, the polarizing plate exhibits a dark black color, and as a result, various colors are difficult to be provided in an area that the polarizing plate is located, and particularly, when a polarizing plate is located on components such as a camera, the polarizing plate absorbs 50% or greater of the quantity of light causing a problem such as visibility decline in a camera lens.

In order to solve such a problem, a method of physically removing some areas of a polarizing plate through punching or cutting has been used. However, in this case, a problem of tearing a polarizing plate may occur during punching or cutting the polarizing plate, and such a problem becomes more serious with a recent trend of a polarizing plate becoming thinner. In addition, the punched or cut area needs to be sufficiently distant from an edge of the polarizing plate in order to punch or cut the polarizing plate without damage, however, this has a problem of not being suitable for a recent design trend of decreasing a bezel unit area.

The applicant of the present invention developed a technology of locally bleaching a polyvinyl alcohol-based polarizer using a strong basic solution in order to solve such a problem, and applied for a patent on the technology (Korean Patent Application No. 10-2014-0006269). However, in the patent technology, there has been a problem in that swelling occurs due to a strong basic solution during bleaching, and the bleached part is swollen compared to other parts, and as a result, wrinkles and deformation occur in a polarizer leading to an increase in haze, and the like.

DISCLOSURE

Technical Problem

An object of the present invention is to provide a polarizing element capable of forming locally bleached areas that may perform functions such as installing components or developing colors without a physical punching or cutting process, and minimizing the occurrence of polarizer deformation during bleaching.

Technical Solution

In one aspect, the present invention provides a method for manufacturing a polarizing element including locally bleached areas including steps of providing a polarizing element including a polyvinyl alcohol-based polarizer in which at least one of iodine and dichroic dye is oriented in a certain direction; partially bleaching the polyvinyl alcohol-based polarizer by bringing a bleaching solution into contact with one surface of the polyvinyl alcohol-based polarizer through a printing method; and correcting an appearance of the partially bleached polarizing element.

Herein, the bleaching solution is preferably a strong basic solution having a pH of 11 to 14, and more specifically, the solution may include one or more types of bleaching agents selected from the group consisting of sodium hydroxide (NaOH), sodium hydrosulfide (NaSH), sodium azide (NaN$_3$), potassium hydroxide (KOH), potassium hydrosulfide (KSH) and potassium thiosulfate (KS$_2$O$_3$). Meanwhile, the concentration of the bleaching agent in the bleaching solution is preferably approximately from 1% by weight to 30% by weight, and the bleaching solution viscosity may be approximately from 1 cps to 2000 cps.

Meanwhile, the step of partially bleaching the polyvinyl alcohol-based polarizer may be carried out using an inkjet marking method or a gravure printing method.

Next, the step of correcting an appearance of the partially bleached polarizing element may be carried out by immersing the polarizing element into a crosslinking solution, and herein, the crosslinking solution may include one or more types of crosslinking agents selected from the group consisting of boron compounds, succinic acid, glutaric acid and citric acid.

In addition, the step of correcting an appearance of the partially bleached polarizing element may be carried out by immersing the polarizing element into a neutralizing solution, and a neutralizing agent included in the neutralizing solution may be employed without limit as long as it is known in the art. For example, according to one embodiment of the present invention, the neutralizing solution may include one or more types of neutralizing agents selected from the group consisting of sulfuric acid, nitric acid, phosphoric acid, acetic acid, citric acid, hydrochloric acid, glutaric acid and succinic acid.

Meanwhile, the manufacturing method of the present invention may further include a step of washing and drying the polarizing element after the appearance correcting step as necessary, and herein, the drying may be carried out using a heating roll having a diameter of 100Φ to 500Φ and preferably 150Φ to 300Φ, and the temperature of the heating roll may be approximately from 30° C. to 150° C. and preferably approximately from 60° C. to 150° C. In addition, the drying period using the heating roll may be approximately from 1 second to 60 seconds and preferably approximately from 1 second to 30 seconds. In the drying step, a method of drying by passing the polarizing element through an oven without passing through the heating roll may also be used. In this case, the drying temperature is approximately from 25° C. to 100° C. and preferably approximately from 30° C. to 80° C.

In addition, the manufacturing method of the present invention may further include a step of forming an optical layer on at least one surface of the polarizing element after the appearance correcting step as necessary.

In another aspect, the present invention provides a polarizing element including locally bleached areas manufactured by the manufacturing method described above.

In another aspect, the present invention provides a method for manufacturing a polarizing element roll including a step of winding the polarizing element including locally bleached areas formed by the manufacturing method of the present invention.

In another aspect, the present invention provides a method for manufacturing a single sheet-type polarizing element including steps of providing a polarizing element from a polarizing element roll manufactured as above; and cutting the polarizing element to a single sheet type. Herein, the cutting step may be carried out using a laser, and more specifically, may be carried out including steps of recognizing a location of a bleached area of the polarizing element; setting a cutting location based on the location of the bleached area; and carrying out the cutting at the cutting location using a laser.

In another aspect, the present invention provides a single sheet-type polarizing element manufactured by using the manufacturing method described above.

In addition, the present invention provides a polarizing plate including the single sheet-type polarizing element.

In another aspect, the present invention provides an image display device including a display panel; and the polarizing plate described above attached to one surface or both surfaces of the display panel.

Advantageous Effects

A manufacturing method of the present invention forms bleached areas in target locations through a chemical bleaching method without a punching or cutting process, therefore, is capable of minimizing polarizing plate damage.

In addition, the manufacturing method of the present invention carries out the bleaching step using a printing process, therefore, bleaching may occur only at target locations, the loss of materials is minimized, and a process can continuously carried out as well, and as a result, the method has advantages in that manufacturing efficiency is excellent, and manufacturing costs are inexpensive.

Meanwhile, the manufacturing method of the present invention carries out an appearance correcting step after a bleaching step, and therefore, minimizes deformation of a polarizing element, which may occur due to a swelling phenomenon in the bleaching process. In addition, by carrying a step of washing and drying the polarizing element after the appearance correcting step as necessary, deformation of the polarizing element can be additionally corrected.

In addition, in a method for manufacturing a single sheet-type polarizing element according to the present invention, the shape of the polarizing element can be freely formed when cutting is carried out using a laser unlike existing polarizing element cutting using a mold or a knife, and there is an advantage in that a degree of freedom is high in design.

Furthermore, when cutting a single sheet-type polarizing element, there are advantages in recognizing the location of bleached areas and cutting a polarizing element based on this recognition because they can minimize defects from the changes in the location of bleached areas in a polarizing plate, and therefore, produce products of uniform quality.

A polarizing plate manufactured according to the manufacturing method of the present invention is capable of forming a depolarized area close to being transparent in an area to install components or develop colors, therefore, has advantages of improving performances of installed components and exhibiting various designs.

MODE FOR DISCLOSURE

Hereinafter, preferred embodiments of the present invention will be described with reference to drawings. However, embodiments of the present invention may be modified to various other forms, and the scope of the present invention is not limited to the embodiments described below. In addition, embodiments of the present invention are provided in order to more completely describe the present invention for those having average knowledge in the art.

Figure 1:
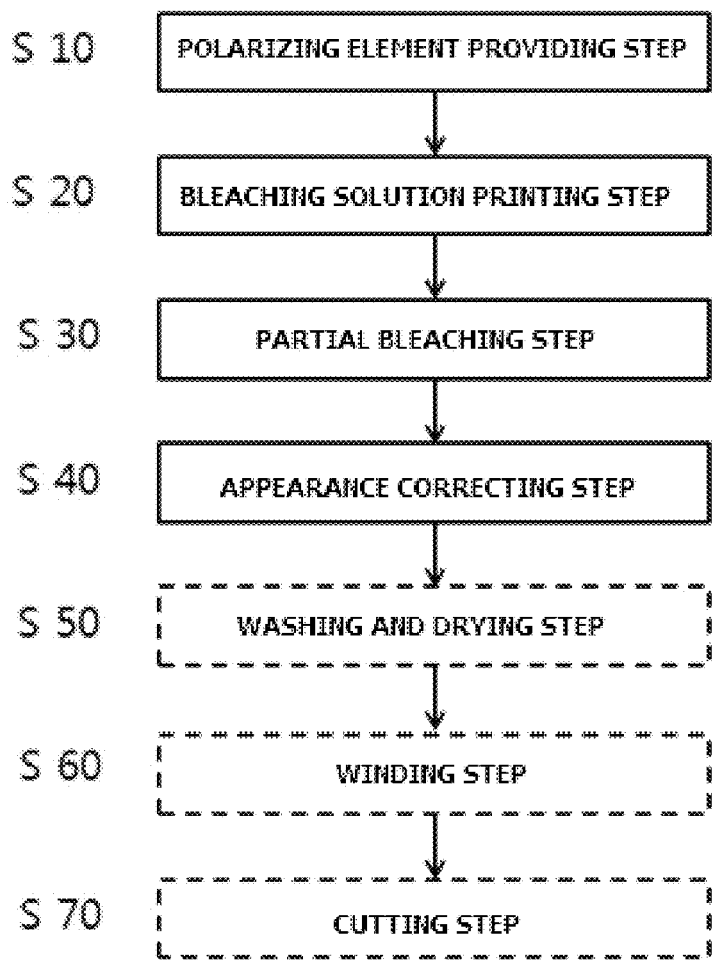
FIG. 1 is a flow chart for describing a method for manufacturing a polarizing element according to the present invention.
Figure 2:
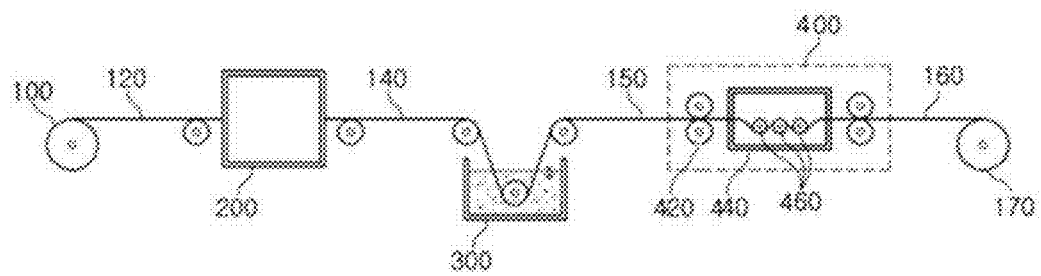
FIG. 2 and FIG. 3 are diagrams each showing one embodiment of a method for manufacturing a polarizing element according to the present invention.
Figure 3:
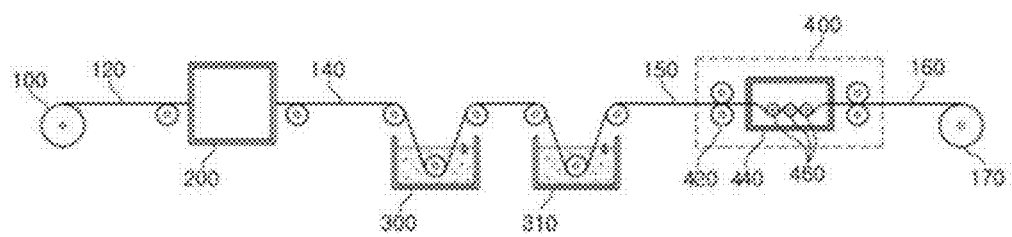

FIG. 1 shows a rough flow chart of a method for manufacturing a polarizing element including locally bleached areas of the present invention, and FIG. 2 and FIG. 3 each show one embodiment of a method for manufacturing a polarizing element according to the present invention. Hereinafter, the present invention will be described in more detail with reference to FIG. 1 to FIG. 3. However, the following descriptions on FIG. 1 to FIG. 3 are only one embodiment of the present invention, and the scope of the present invention is not limited to the descriptions.

As shown in FIG. 1, a method for manufacturing a polarizing element of the present invention includes steps of providing a polarizing element including a polyvinyl alcohol-based polarizer in which at least one or more of iodine and dichroic dye is oriented in a certain direction (S10); partially bleaching the polyvinyl alcohol-based polarizer by bringing a bleaching solution into contact with one surface of the polyvinyl alcohol-based polarizer through a printing method (S20, S30); and correcting an appearance of the partially bleached polarizing element (S40).

The "bleaching solution printing step (S20)" in the present specification may mean bringing a bleaching solution into contact with one surface of the polyvinyl alcohol-based polarizer through a printing method.

"Partially bleaching" in the present specification may mean areas in a polarizing element exposed by a punching unit of a mask layer being bleached. In addition, areas of a polarizing element bleached by the partially bleaching may correspond to locally bleached areas of a polarizing element.

Meanwhile, the method for manufacturing a polarizing element of the present invention may further include, as necessary, a step of washing and drying the polarizing element gone through the appearance correcting step (S50), and may further include a step of winding the polarizing element including locally bleached areas manufactured through a method such as above to prepare the polarizing element to a long polarizing element roll (S60). In addition, as necessary, a method for manufacturing a polarizing element of the present invention may further include a step of manufacturing a single sheet-type polarizing element from the long polarizing element roll (S70).

First, in the step of providing a polarizing element (S10), the polarizing element includes a polyvinyl alcohol-based polarizer in which at least one of more of iodine and dichroic dye is oriented in a certain direction, and for example, may include a polyvinyl alcohol-based polarizer in which iodine and/or dichroic dye are oriented in a certain direction, or a film laminate including such a polyvinyl alcohol-based polarizer and a transparent polymer film attached to one surface of the polarizer. In other words, in the present invention, the polarizing element may be formed only with a polyvinyl alcohol-based polarizer, or may further include a transparent polymer film on one surface of the polyvinyl alcohol-based polarizer. Herein, the polyvinyl alcohol-based polarizer may have a thickness of approximately 1 µm to 50 µm, for example, approximately 10 µm to 30 µm or approximately 1 µm to 10 µm, and the transparent polymer film may have a thickness of approximately 1 µm to 100 µm, for example, approximately 10 µm to 70 µm.

Meanwhile, in the present invention, a polarizing element roll (100), a polarizing element in a film roll state in which a long polarizer film, or a laminate of a polarizer film and a transparent polymer film is wound in a roll shape, may be used as the polarizing element, and in this case, the polarizing element (120) may be provided into a process by being unwound from such a film roll.

Meanwhile, the polyvinyl alcohol-based polarizer in which at least one of iodine and dichroic dye is oriented in a certain direction may be manufactured through a Polarizer manufacturing method well known in the art, or a commercially available polyvinyl alcohol-based polarizer may be purchased and used.

For example, the polyvinyl alcohol-based polarizer may be manufactured through steps of dyeing iodine and/or dichroic dye on an unelongated polyvinyl alcohol-based film, crosslinking the polyvinyl alcohol-based film and the iodine and/or dichroic dye, and elongating the polyvinyl alcohol-based film dyed with the iodine and/or dichroic dye. Herein, the dyeing step, the crosslinking step and the elongating step may be carried out through methods known in the art, and the methods are not particularly limited.

For example, the dyeing step may be carried out by immersing an unelongated polyvinyl alcohol-based film into a dyeing bath filled with a dyeing solution containing iodine and/or dichroic dye, or coating a dyeing solution containing iodine and/or dichroic dye on a polyvinyl alcohol-based film, and herein, water is generally used as a solvent of the dyeing solution, however, an organic solvent having compatibility with water may be mixed thereto. Meanwhile, the iodine and/or dichroic dye content in the dyeing solution, may be, while not being limited thereto, for example, approximately from 0.06 parts by weight to 0.25 parts by weight with respect to 100 parts by weight of the solvent. In addition, an auxiliary agent may be additionally included in the dyeing solution besides the iodine and/or dichroic dye in order to enhance dyeing efficiency, and iodide compounds such as potassium iodide, lithium iodide, sodium iodide, zinc iodide, aluminum iodide, lead iodide, copper iodide, barium iodide, calcium iodide, tin iodide, titanium iodide or a mixture thereof may be used as the auxiliary agent. Herein, the auxiliary agent content may be, while not being limited thereto, for example, approximately from 0.3 parts by weight to 2.5 parts by weight with respect to 100 parts by weight of the solvent, and more preferably, the weight ratio of the iodine and the iodide compound may be approximately from 1:5 to 1:10. Meanwhile, the dyeing step is preferably carried out at a temperature of approximately 25° C. to 40° C., and the period of immersion in the dyeing bath is preferably approximately from 30 seconds to 120 seconds, however, the temperature and the period are not limited thereto.

Next, the crosslinking step may be carried out by bringing a crosslinking solution into contact with the polyvinyl alcohol-based film dyed with iodine and/or dichroic dye, and the contact may be carried out through methods such as immersion, coating and spraying. Herein, the crosslinking solution is a solution including a crosslinking agent such as boron compounds such as boric acid and borax; glyoxal; glutaraldehyde; or a mixture thereof, and water is generally used as a solvent of the crosslinking solution, however, an organic solvent having compatibility with water may be mixed and used with water. The crosslinking agent content in the crosslinking solution may be, while not being limited thereto, for example, approximately from 0.5 parts by weight to 5.0 parts by weight with respect to 100 parts by weight of the solvent. Meanwhile, the crosslinking temperature and the crosslinking period are not particularly limited, and may be properly adjusted depending on the crosslinking agent content and the like. For example, the crosslinking temperature may be approximately from 45° C. to 60° C., and the crosslinking period may be approximately from 30 seconds to 120 seconds.

Next, the elongating step may be carried out through polarizer elongating methods well known in the art such as wet elongation or dry elongation, and while not being limited thereto, the elongation percentage may be from 4 times to 10 times, and the elongation temperature may be from approximately 45° C. to 60° C. Meanwhile, the elongating step may be carried out either simultaneously or separately with the dyeing step or the crosslinking step.

Meanwhile, the elongation may be carried out on a polyvinyl alcohol-based film alone, or may be carried out by laminating a substrate film on a polyvinyl alcohol-based film, and elongating the polyvinyl alcohol-based film and the substrate film together. The latter method is used in order to prevent the breakage of a polyvinyl alcohol-based film during elongation when elongating a thin polyvinyl alcohol-based film (for example, a PVA film having a thickness of 60 μm or less), and may be used to manufacture a thin Polarizer having a thickness of 10 μm or less. Herein, as the substrate film, polymer films having a maximum elongation percentage of 5 or more times under a temperature condition of 20° C. to 85° C. may be used, and examples thereof may include a high-density polyethylene film, a polyurethane film, a polypropylene film, a polyolefin film, an ester-based film, a low-density polyethylene film, a coextrusion film of high-density polyethylene and low-density polyethylene, a copolymer resin film containing ethylene vinyl acetate in high-density polyethylene, an acrylic film, a polyethylene terephthalate film, a polyvinyl alcohol-based film, a cellulose-based film, and the like. Meanwhile, the maximum elongation percentage means an elongation percentage immediately before breakage. Herein, the laminating method of the substrate film and the polyvinyl alcohol-based film is not particularly limited. For example, the substrate film and the polyvinyl alcohol-based film may be laminated with an adhesive or a gluing agent as a medium, or may be laminated by placing the polyvinyl alcohol-based film on the substrate film without a separate medium. Alternatively, the lamination may be carried out by coextruding a resin forming the substrate film and a resin forming the polyvinyl alcohol-based film, or by coating a polyvinyl alcohol-based resin on the substrate film. Meanwhile, the substrate film may be removed by being released from a polarizer after completing the elongation, however, the process may be progressed to a next step without removing the substrate film. In this case, the substrate film may be used as a polarizer protective film and the like.

Meanwhile, a polarizing element including a film laminate in which a polyvinyl alcohol-based polarizer and a transparent polymer film are laminated may be manufactured using a method of attaching a transparent polymer film on one surface of the polyvinyl alcohol-based film prepared through a method such as above. Herein, as the transparent polymer film, an acetate-based such as triacethyl cellulose (TAC), an acrylic-based, a polyester-based, a polyethersulfone-based, a polycarbonate-based, a polyamide-based, a polyimide-based, a polyolefin-based resin film and the like may be used, however, the transparent polymer film is not limited thereto. Meanwhile, the transparent polymer film may be attached through film lamination methods well known in the art, and for example, lamination may be carried out by adhering the polyvinyl alcohol-based polarizer and the transparent polymer film with an adhesive well known in the art such as a water-based adhesive such as a polyvinyl alcohol-based adhesive, a heat-curable adhesive such as an urethane-based adhesive, a photocation-curable adhesive such as an epoxy-based adhesive, a photoradical-curable adhesive such as an acryl-based adhesive as a medium, and then curing the adhesive by heat or active energy ray irradiation.

In this step, a protective film may be laminated on one surface of the polyvinyl alcohol-based polarizer to perform a role of protecting the appearance of the polarizer. Specifically, when a transparent polymer film is laminated on one surface of the polyvinyl alcohol-based polarizer, a protective film is laminated on the surface on which the transparent polymer film is not laminated. As the protective film, an olefin-based film such as polyethylene (PE), polypropylene (PP) and polyethylene terephthalate (PET); or a vinyl acetate-based film such as ethylene vinyl acetate (EVA) and polyvinyl acetate may be used, however, the protective film is not limited thereto. The protective film may be stripped off after performing a role of protecting the appearance of a polarizer.

Next, when a polarizing element such as above is provided, a step of partially bleaching the polyvinyl alcohol-based polarizer by bringing a bleaching solution into contact with one surface of the polyvinyl alcohol-based polarizer is carried out through a printing method (S20, S30). Specifically, when a substrate, a protective film or a transparent polymer film is provided on one surface of the polarizer, the step of partially bleaching the polyvinyl alcohol-based polarizer is carried out through a printing method by bringing a bleaching solution into contact with the surface on which the substrate, the protective film or the transparent polymer film is not provided.

When a bleaching process is carried out using a printing method, there is an advantage of securing competitiveness in costs through reducing raw materials and processes compared to a coating process or an immersion process requiring a mask film and the like. In addition, a bleached unit having a closed curve is difficult to be formed when using a mask film, however, a bleached unit having a closed curve is readily obtained when using a printing method.

Herein, the bleaching solution is a solution including a bleaching agent capable of bleaching iodine and/or dichroic dye, and herein, the bleaching agent may be a bleaching agent capable of bleaching iodine and/or dichroic dye, and is not particularly limited, however, examples thereof may include one or more types selected from the group consisting of sodium hydroxide (NaOH), sodium hydrosulfide (NaSH), sodium azide ($NaN_3$), potassium hydroxide (KOH), potassium hydrosulfide (KSH) and potassium thiosulfate ($KS_2O_3$).

Meanwhile, the concentration of the bleaching agent in the bleaching solution may be approximately from 1% by weight to 30% by weight, preferably approximately from 5% by weight to 20% by weight, and more approximately from 10% by weight to 15% by weight. When the bleaching agent content is less than 1% by weight, bleaching may not occur, or time taken for bleaching becomes longer causing deformation of the polarizing element due to swelling, and when the bleaching agent concentration is greater than 30% by weight, economic feasibility decreases since the amount of an increase in bleaching efficiency is insignificant.

Meanwhile, water, or a mixed solvent of water and alcohol may be used as a solvent of the bleaching solution, and herein, methanol, ethanol, butanol, isopropyl alcohol and the like may be used either alone or as a mixture thereof as the alcohol.

Meanwhile, the bleaching solution is more preferably a strong basic solution having a pH of 11 to 14 and preferably 13 to 14. When such a strong basic solution is used, bleaching may be smoothly achieved since boric acid cross-linking bonds between polyvinyl alcohol, and iodine and/or dichroic dye are destroyed.

Meanwhile, the bleaching solution may have viscosity of approximately 1 cP to 2000 cP and preferably approximately 5 cP to 2000 cP. When the bleaching solution viscosity satisfies the above-mentioned range, the printing process may be smoothly carried out, and the printed bleaching solution being diffused or flowing down by the movement of a polarizing element may be prevented in a continuous process line, and as a result, bleached areas may be formed in a target shape in a target area. Meanwhile, the bleaching solution viscosity may be properly changed depending on the printing device used, surface characteristics of Polarizer and the like. For example, when using a gravure printing method, the bleaching solution viscosity may be approximately from 1 cps to 2000 cps preferably approximately from 5 cps to 200 cps and more preferably approximately from 30 cps to 70 cps, and when using an inkjet printing method, the bleaching solution viscosity may be approximately from 1 cps to 30 cps and preferably approximately from 1 cps to 20 cps.

Meanwhile, the bleaching solution may additionally include a viscosity agent as necessary in order to adjust viscosity and the like. The viscosity agent is not limited in the type as long as it has low reactivity and is capable of increasing the viscosity of a solution, however, examples thereof may include one or more types selected from the group consisting of a polyvinyl alcohol-based resin, a polyvinyl acetoacetate-based resin, an acetoacetyl group-modified polyvinyl alcohol-based resin, a butenediol vinyl alcohol-based, a polyacrylamide-based and a polyethylene glycol-based.

Meanwhile, the viscosity agent may be included in approximately 0.5% by weight to 30% by weight and preferably in approximately 2.5% by weight to 15% by weight with respect to the total weight of the bleaching solution. When the viscosity agent content is greater than the above-mentioned range, viscosity excessively increases, therefore, a printing process is difficult to be smoothly conducted and washing is not effectively carried out, and when the viscosity agent content is too low, viscosity is low, and obtaining a bleached area having a target shape and size is difficult due to the diffusion and floating of the liquid.

Figure 3A:
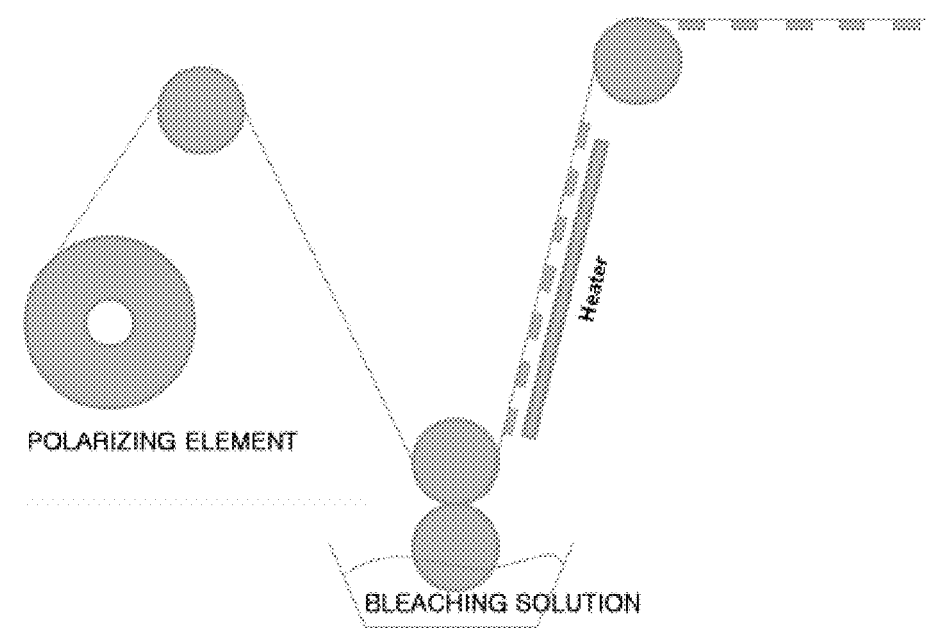
FIG. 3a is a diagram showing a specific structure of gravure printing, one example of the printing devices of FIG. 2 and FIG. 3.

In the present invention, the bleaching solution printing step (S20) may be carried out using a printing device (200) and the like, and herein, the printing device is, while not being limited thereto, preferably a device carrying out printing using an inkjet marking method, a gravure printing method or the like considering the readiness of carrying out a continuous process. Herein, the inkjet marking method refers to a printing method carried out by dropping an ink liquid drop on a printed object (Polarizer) through an inkjet nozzle, and the gravure printing method refers to a printing method carried out by filling an ink in a printing roll engraved with a shape to print, leaving the ink only in the engraved part by removing the ink in the area other than the engraved part through a doctor blade and the like, and then, transferring the ink filled in the engraved part to a printed object (Polarizer) using a transfer roll. Specifically, FIG. 3a is a diagram showing a specific structure of gravure printing, one example of the printing devices of FIG. 2 and FIG. 3.

Meanwhile, various types of marking methods used in inkjet printing may be used as the inkjet marking method, and while not being limited thereto, for example, contactless inkjet marking method and the like may be used in order to prevent polarizer damage. Contactless inkjet marking may be divided into a circulating type (Continue Ink Jet (CIJ)) and a non-circulating type (Drop On Damage (DOD), Pieze), and a proper inkjet marking method may be selected and used depending on the surface condition of a polarizer, a printed object, the desired degree of bleaching, the size of bleached areas, the moving speed of a polarizing element, the distance of spraying and the like.

Figure 8:
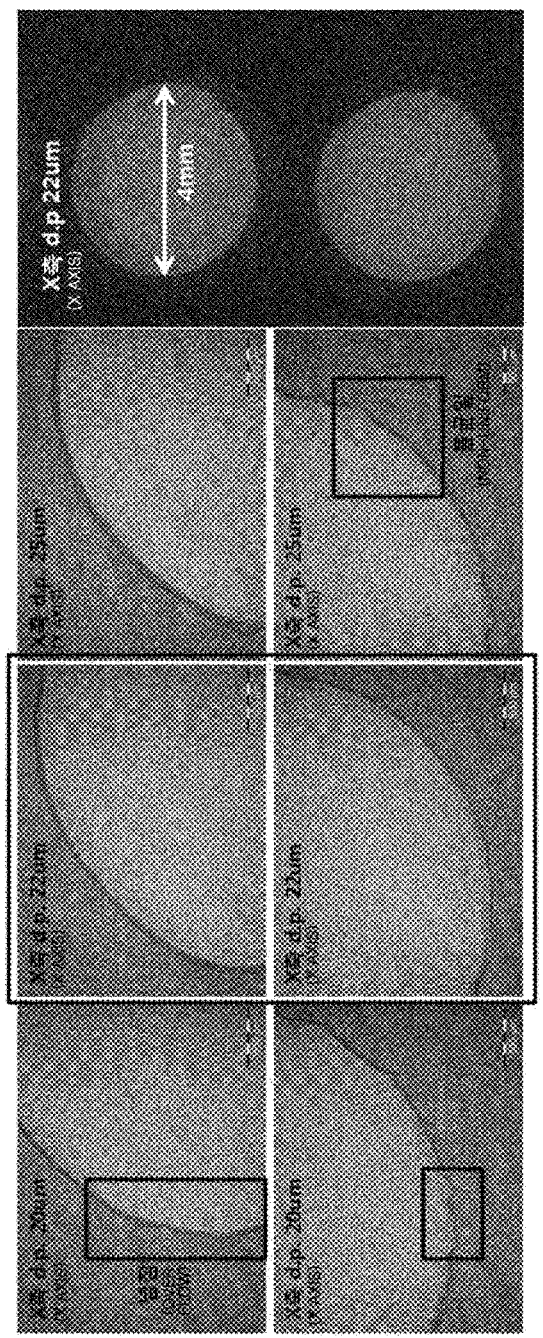
FIG. 8 is an image of a bleached unit boundary depending on the coated amount of an ink photographed using an optical microscope.

According to one embodiment of the present invention, the bleaching solution printing step (S20) may be carried out using an inkjet marking method. Herein, when the partially bleaching step is carried out using an inkjet marking method after deriving an optimized ink amount, there is an advantage in that a separate washing step to remove the residual ink may not be included. For example, according to the research results of the inventors of the present invention, when testing is carried out while fixing a Y-axis dot pitch at 60 μm at a tilting angle of 84° using a printer head having 128 nozzles (80 pL (picoliter)), bleached unit boundary visibility is shown to be the highest when a X-axis dot pitch is 22 μm. Meanwhile, when the X-axis dot pitch is 20 μm, a phenomenon of boundary pattern collapse occurs due to ink overflow, and when the X-axis dot pitch is 25 μm, a phenomenon of boundary non-uniformity occurs due to ink insufficiency. An image of the bleached unit boundary depending on the X-axis dot pitch photographed using an optical microscope is shown in FIG. 8.

According to one embodiment of the present invention, the partially bleaching step may be carried out using a gravure printing method. According to the research results of the inventors of the present invention, carrying out the step under a condition of a roll-to-roll process rate of approximately 20 m/min, a bleaching solution viscosity of approximately 50 cps and a heater temperature of approximately 60° C. to 70° C. is most preferable in terms of mass production feasibility. Herein, the heater performs a role of drying the bleaching solution transferred to the polarizer so that the bleaching solution does not flow, and consequently, performs a role of supporting efficient bleaching. Meanwhile, using a #200 roll mesh is preferable in term of obtaining a bleached unit having a target shape in a target area. The inside of an engraved part in a gravure printing roll is in a mesh form, and #200 means that the number of lines forming the mesh form is 200. When using a roll mesh of less than #200, there is a problem in that a target shape is difficult to be obtained since the shape of the mesh appears in the bleached unit.

When the bleaching solution is applied to some areas of the polarizer through such a printing process, the corresponding area is bleached as iodine and/or dichroic dye are decomposed by the bleaching agent in the bleaching solution.

Herein, the bleached are is not particularly limited in the shape or forming location, and may be formed in various shapes on various locations. For example, the bleached area may be formed on the location at which a component such as a camera is installed so as to cope with the shape of the component, may be formed to have a product logo shape in an area in which the product logo is printed, or may be formed in a frame form on the edge part of the polarizing element when attempting to provide a color on the edge part of the polarizing element.

Meanwhile, when such a partially bleaching process is complete, a step of washing the bleaching solution (not shown) may be carried out as necessary. This is due to the fact that, when a bleaching solution remains in a polarizing element, polarizer bleaching may occur in a post-process in undesired areas due to the residual bleaching solution. Herein, the washing may be carried out using a method of immersing the polarizing element into alcohol or an aqueous acid solution, or dropping alcohol or an aqueous acid solution on the polarizing element, and herein, examples of the alcohol may include ethanol, methanol, propanol, butanol, isopropyl alcohol or a mixture thereof, and examples of the acid solution may include an aqueous acetic acid solution, an aqueous adipic acid solution, an aqueous boric acid solution, an aqueous phosphoric acid solution, an aqueous lactic acid solution, an aqueous sulfuric acid solution, an aqueous nitric acid solution or a mixed solution thereof, but are not limited thereto. The washing step is preferably carried out for approximately 1 second to 180 seconds and preferably for approximately 3 seconds to 60 seconds.

Next, a step of correcting an appearance (S40) of the partially bleached polarizing element (140) is carried out. A polarizing element partially bleached using a bleaching solution as in the present invention has a problem in that the shape of the polarizing element changes due to the occurrence of swelling in the bleached part due to the bleaching solution. This step is for recovering the deformed shape of the polarizing element as above. In other words, the appearance correcting step is a step of recovering the appearance of the polarizing element deformed by the bleaching solution.

According to one embodiment of the present invention, the appearance correcting step may be carried out by immersing the polarizing element into a crosslinking solution (310). In other words, the appearance correcting step may include a crosslinking step.

Herein, the crosslinking solution includes one or more types of crosslinking agents selected from the group consisting of boron compounds such as boric acid and borax; and an acid such as succinic acid, glutaric acid and citric acid, and herein, the crosslinking agent content may be different depending on the type of the crosslinking agent, however, the content may be, for example, approximately from 0.001% by weight to 20% by weight, preferably approximately from 0.003% by weight to 15% by weight, and more preferably approximately from 0.005% by weight to 10% by weight. More preferably, the crosslinking agent content may be approximately from 0.001% by weight to 5% by weight when using a boron compound as the crosslinking agent, and the crosslinking agent content may be approximately from 0.001% by weight to 1% by weight when using an acid as the crosslinking agent. When the crosslinking agent content satisfies the above-mentioned range, a process yield, quality of the polarizing plate appearance, optical properties, durability and the like are excellent. Meanwhile, water (purified water) may be used as a solvent of the crosslinking solution.

Meanwhile, although not being mandatory, an iodide compound such as potassium iodide, lithium iodide, sodium iodide, zinc iodide, aluminum iodide, lead iodide, copper iodide, barium iodide, calcium iodide, tin iodide, titanium iodide or a mixture thereof may be additionally included to the crosslinking solution in order to control physical properties and colors of a polarizing plate. Herein, the iodide compound content is preferably approximately from 3% by weight to 5% by weight. The iodide compound content being outside the above-mentioned range may have an adverse effect on heat resistance and color properties of the polarizer.

Meanwhile, the temperature of the crosslinking solution during the crosslinking may be, while not being limited thereto, for example, approximately from 10° C. to 70° C., preferably approximately from 15° C. to 65° C., and more preferably approximately from 20° C. to 60° C. When the temperature of the crosslinking solution satisfies the above-mentioned range, polarizing element deformation due to bleaching may be effectively corrected, and when the temperature is outside the above-mentioned range, optical properties or appearance quality of the polarizing element may be degraded, and in severe cases, polarizing element deformation may become worse.

In addition, the crosslinking period may be, while not being limited thereto, for example, approximately from 1 second to 120 seconds, preferably approximately from 1 second to 90 seconds, and more preferably approximately from 1 second to 60 seconds. When the crosslinking period satisfies the above-mentioned range, polarizing element deformation due to bleaching may be effectively corrected, and when the crosslinking period is outside the above-mentioned range, optical properties or quality of the polarizing element may be degraded, and in severe cases, polarizing element deformation may become worse.

When immersing the polarizing element into a crosslinking solution including a crosslinking agent as above, an effect of correcting the polarizing element deformation may be obtained as polyvinyl alcohol chains of the PVA film bond to each other by a boron compound or acid included in the crosslinking solution. According to the research results of the inventors of the present invention, a dimensional deformation rate in the bleached part is shown to decrease by 10% to 70% and generally up to approximately by 20% to 60% when crosslinking is carried out after the bleaching step compared to a case in which no crosslinking is carried out.

According to one embodiment of the present invention, the appearance correcting step may be carried out by immersing the polarizing element into a neutralizing solution (300). In other words, the appearance correcting step may include a neutralizing step.

Herein, the neutralizing solution includes a neutralizing agent, and the neutralizing agent may employ those known in the art without limit. For example, the neutralizing solution includes one or more types of neutralizing agents selected from the group consisting of sulfuric acid, nitric acid, phosphoric acid, acetic acid, citric acid, hydrochloric acid, glutaric acid and succinic acid, and herein, the neutralizing agent content may be different depending on the type of the neutralizing agent, however, the content may be approximately from 0.001% by weight to 20% by weight, preferably approximately from 0.003% by weight to 15% by weight, and more approximately from 0.005% by weight to 10% by weight. More preferably, the neutralizing agent content may be approximately from 0.01% by weight to 10% by weight when using acetic acid or citric acid. When the neutralizing agent content satisfies the above-mentioned range, a process yield, quality of the polarizing plate appearance, optical properties, durability and the like are excellent. Meanwhile, water (purified water) may be used as a solvent of the neutralizing solution.

The temperature and the neutralizing period of the neutralizing solution, the same details on the temperature and the crosslinking period of the crosslinking solution described above may be applied, respectively. Specifically, the temperature of the neutralizing solution in the neutralization may be, while not being limited thereto, for example, from 5° C. to 70° C. In addition, the neutralizing period may be, while not being limited thereto, for example, approximately from 3 seconds to 30 seconds.

When immersing the polarizing element into a neutralizing solution as above, an effect of correcting the deformation of the polarizing element appearance caused by bleaching may be obtained as a cation of the basic solution used in the bleaching step (S20) is removed by the neutralization.

In addition, according to one embodiment of the present invention, the appearance correcting step may include a crosslinking step and a neutralizing step. Specifically, a crosslinking step may be carried out after carrying out a neutralizing step, and in this case, an effect of correcting the appearance deformation may be obtained by neutralization, and an effect of fixing the correction may be obtained through crosslinking. One embodiment of the present invention including an appearance correcting step carrying out a neutralizing step and then carrying out a crosslinking step is specifically shown in FIG. 3.

According to the research results of the inventors of the present invention, a dimensional deformation rate in the bleached part is shown to decrease by 10% to 70% and generally up to approximately by 20% to 60% when such an appearance correcting step is carried out after the bleaching step compared to a case in which no appearance correcting step is carried out.

Specifically, the thickness of the polarizing element becomes thicker by approximately 5% to 30% when bleaching is carried out compared to before the bleaching, and the appearance of the polarizing element is deformed to a shape in which the bleaching part rises due to the thickness difference with the surrounding parts. Carrying out the appearance correcting step after the bleaching step is effective in decreasing the thickness of the polarizing element up to approximately by 5% to 30% again, and the thickness is shown to be similar to the thickness before the bleaching step, therefore, an appearance correction effect is exhibited as the thickness difference with the surrounding parts decreases. According to the research results of the inventors of the present invention, it is seen that, when the neutralizing step is carried out after the bleaching step, the degree of being deformed to a shape in which the bleaching part rises is reduced by approximately 7% to 22% compared to a case in which only washing with purified water is carrying out.

In addition, the surface opposite to the surface that is deformed to have a risen shape among the bleaching parts of the polarizing element has a sunken shape compared to the surrounding parts due to contractional deformation of the polarizing element after the bleaching, however, carrying out the appearance correcting step after the bleaching step reduces such a phenomenon, and an effect of appearance correction is exhibited. Specifically, according to the research results of the inventors of the present invention, it is seen that, when the neutralizing step is carried out after the bleaching step, the degree of appearance deformation of sagging down compared to the surrounding parts is reduced by approximately 60% to 80% compared to a case in which only washing with purified water is carrying out.

Next, a step of washing and drying (S50) the crosslinked polarizing element (150) may be additionally carried out as necessary after completing an appearance correcting step such as above. This step is for washing the crosslinking solution and/or neutralizing solution remaining in the polarizing element, and additionally correcting the deformation of the polarizing element appearance caused by the bleaching solution, and washing and drying methods of polarizing elements known in the art may be used.

For example, the washing and drying step may be carried out using a method of passing the polarizing element through a washing roll (420) and a heating roll (460), and herein, the heating roll (460) may have a diameter of approximately 100Φ to 500Φ, and preferably approximately 150Φ to 300Φ. The temperature of the heating roll (460) may be approximately from 30° C. to 150° C., and preferably approximately from 60° C. to 150° C. According to the research results of the inventors of the present invention, an effect of correcting the deformation of the polarizing element appearance is different depending on the diameter and the temperature of the heating roll (460) in the washing and drying step, and when the diameter and the temperature of the heating roll satisfy the above-mentioned ranges, deformation of the polarizing element appearance is shown to be effectively corrected. In the drying step, drying may be carried out by passing the polarizing element through a drying oven without passing through the heating roll. In this case, the drying temperature may be from approximately 25° C. to 100° C., and preferably approximately from 30° C. to 80° C.

According to one embodiment of the present invention, the drying in the washing and drying step may use a method of passing the polarizing element through a drying oven.

In addition, the manufacturing method of the present invention may include, although not being mandatory, a step of forming a planarization layer on one side of the Polarizer after the appearance correcting step in order to additionally enhance surface smoothness of the polarizing element. Herein, the planarization layer is preferably formed on the surface that is in contact with the bleaching solution, and the thickness is approximately from 1 μm to 10 μm, and more preferably approximately from 2 μm to 5 μm.

In addition, the manufacturing method of the present invention may further include, although not being mandatory, a step of forming an optical layer on at least one surface of the polarizing element (not shown) after the appearance correcting step as necessary. Herein, the optical layer may be a polymer film layer such as a protective film or a retardation film, may be a functional film layer such as a brightness enhancement film, may be a functional layer such as a hard coating layer, an anti-reflection layer, an adhesive layer and a gluing layer, or may be a combination thereof.

Meanwhile, the optical layer may be directly attached or formed on the surface of the polyvinyl alcohol polarizer, or, when a film or a coating layer is formed on one surface of the polyvinyl alcohol polarizer, may be attached on the film or the resin coating layer.

The method of forming the optical layer may be different depending on the type of the optical layer to form, and for example, methods of forming an optical layer well known in the art may be used, and the method is not particularly limited.

In another aspect, the present invention provides a polarizing element including locally bleached areas manufactured through processes such as above. In other words, one embodiment of the present invention provides a polarizing element including locally bleached areas manufactured using the method for manufacturing a polarizing element described above. The locally bleached area may be a depolarized area. The depolarized area has single transmittance of 80% or greater, preferably 85% or greater and more preferably 90% or greater in a wavelength band of 400 nm to 800 nm and more preferably 450 nm to 750 nm, which is a visible region. In addition, the depolarized area has a polarization degree of 10% or less and more preferably 5% or less. As the depolarized area has higher single transmittance and a lower polarization degree, visibility is enhanced, and performances and image qualities of a camera lens to be located in the area may be further enhanced.

"Single transmittance" in the present specification is expressed as an average value of transmittance of an absorption axis and transmittance of a transmittance axis in a polarizing plate. In addition, "single transmittance" and "polarization degree" in the present specification are values measured using a V-7100 model manufactured by JASCO.

Meanwhile, the polarizing element (160) including locally bleached areas of the present invention manufactured through processes such as above may have the form of a long film, and by winding the polarizing element, a step of manufacturing a roll (170) of the polarizing element including locally bleached areas (S60) may be additionally carried out.

Figure 4:
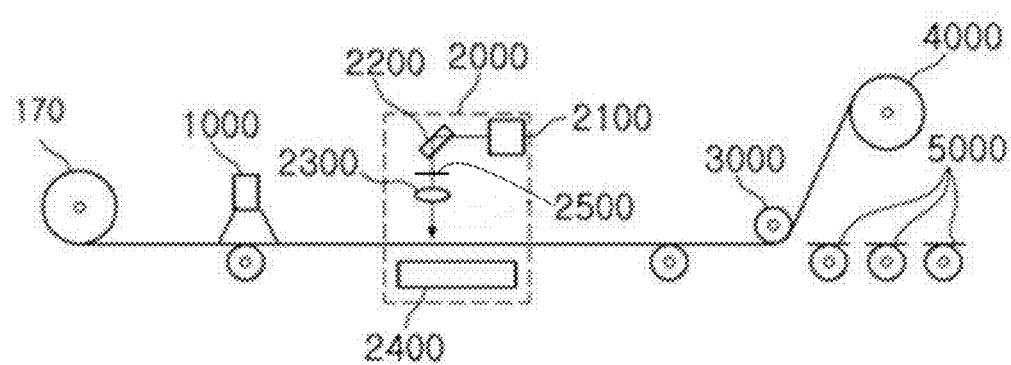
FIG. 4 is a diagram showing one embodiment of a method for manufacturing a single sheet-type polarizing element according to the present invention.

Meanwhile, the present invention provides a method for manufacturing a single sheet-type polarizing element including locally bleached areas, the method including a step of manufacturing a single sheet-type polarizing element (S70) by cutting the polarizing element roll of the present invention manufactured as above. FIG. 4 is a diagram showing one embodiment of a method for manufacturing a single sheet-type polarizing element according to the present invention.

The method for manufacturing a single sheet-type polarizing element including locally bleached areas of the present invention includes steps of providing a polarizing element from a roll of the polarizing element including locally bleached areas manufactured according to the method of the present invention; and cutting the polarizing element into a chip shape.

Figure 5:
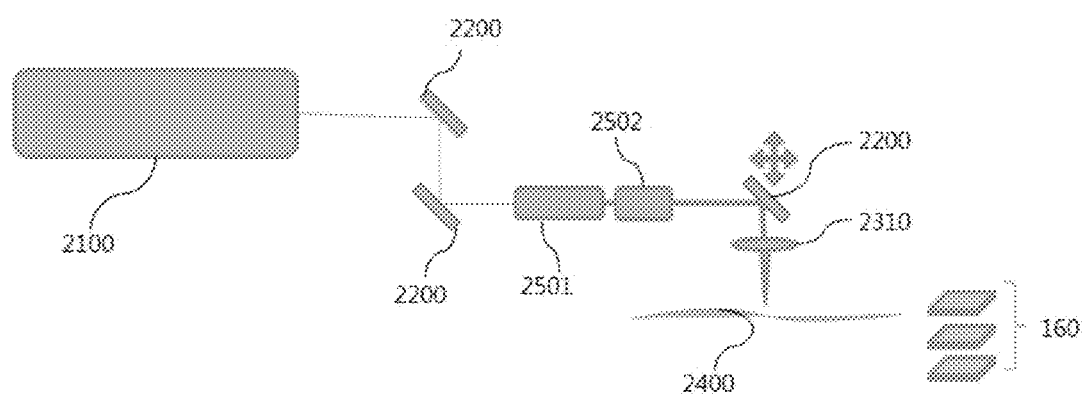
FIG. 5 is a diagram showing a specific structure of laser equipment.

Herein, the step of providing a polarizing element may be carried out using a method of unwinding the polarizing element from a roll (170) of the polarizing element including locally bleached areas, and the cutting step is, while not being limited thereto, preferably carried out using a laser (2000). It is due to the fact that, when cutting a polarizing element using a mold or a knife, the occurrence of defects increases since controlling the bleached area to be in the same location is difficult in the cut polarizing element. In addition, cutting with a laser is advantageous in that the shape of the polarizing element is relatively freely controlled compared to using a mold or knife. For example, when cutting the polarizing element using a laser, modifications such as making the four edge shapes of the polarizing element different from each other, or cutting the polarizing element into a curve shape instead of a straight line shape may be made. Constituents of the laser equipment (2000) are not particularly limited as long as they are known in the art, and for example, a laser (2100), a reflection mirror (2200), an F-Theta lens (2300), a beam expender (2501), a beam shaper (2502), a substrate (2400) and the like may be included. Specifically, the beam shaper (2502) and the beam expender (2501) may be inserted between the reflection mirror (2200) and the F-Theta lens (2300). In the drawing, only one is located between the reflection mirror (2200) and the F-Theta lens (2300), however, any one of the beam shaper (2502) and the beam expender (2501) may be used alone, or both may be used. A specific structure of the laser equipment (2000) of FIG. 4 is shown in FIG. 5.

More preferably, the cutting step may include, as shown in FIG. 4, steps of recognizing a location of the bleached area of the polarizing element; setting a cutting location based on the location information of the bleached area; and carrying out the cutting at the cutting location using a laser. Herein, the step of recognizing a location of the bleached area may be carried out using VISION equipment (1000) such as a CCD camera, and the location of the bleached area may be, for example, a specific location such as the center of the bleached area. Meanwhile, while not being mandatory, the VISION equipment (1000) may be set to recognize the end location or the progress direction of the polarizing element in addition to recognizing the location of the bleached area, or separate VISION equipment (not shown) for recognizing the end location or the progress direction of the polarizing element may be provided, in order to enhance cutting precision.

Next, the step of setting a cutting location of the polarizing element is carried out using the location of the bleached area. This step may be carried out through an arithmetic equipment (not shown) electrically connected to the VISION equipment (1000), and information on the set cutting location is transferred to laser equipment (2000). Next, the polarizing element is cut using the laser equipment (2000) following the information on the cutting location.

When cutting the polarizing element through a method such as above, the cutting location is set from the location of the bleached area, therefore, the locations of the bleached areas are identical in the finally produced single sheet-type polarizing element (5000), and as a result, defects may decrease and quality uniformity may be enhanced.

When cutting the polarizing element through a process such as above, a single sheet-type polarizing element (5000) may be obtained by separating the cut single sheet-type polarizing element (5000) from the remainder (4000) using a stripping roll (3000) and the like.

In another aspect, the present invention provides a single sheet-type polarizing element including locally bleached areas manufactured by using the method for manufacturing a single sheet-type polarizing element described above.

In another aspect, the present invention provides a polarizing plate including the single sheet-type polarizing element. As described above, the locally bleached area may be a depolarized area, and as the single transmittance and the polarization degree of the depolarized area, those described above may be applied. Meanwhile, the single transmittance of areas in the polarizing plate excluding the depolarized area is preferably from 40% to 47%, and more preferably from 41% to 46%. Moreover, the areas in the polarizing plate excluding the depolarized area preferably has a polarization degree of 99% or higher. This is due to the fact that the rest of the area excluding the depolarized area needs to exhibit excellent optical properties shown in the range described above by performing a primary function as a polarizing plate.

The polarizing plate may include constituents known in the art except including the polarizing element including locally bleached areas manufactured according to one embodiment of the present invention. For example, a retardation film, a hard coating layer and the like may be further included, however, the constituents are not limited thereto.

In another aspect, the present invention provides an image display device including a display panel; and the polarizing plate described above attached to one surface or both surfaces of the display panel.

The display panel may include a liquid crystal panel, a plasma panel and an organic light emitting panel, and accordingly, the image display device may include a liquid crystal display (LCD), a plasma display panel (PDP) and an organic light emitting diode (OLED).

More specifically, the image display device may be a liquid crystal display including a liquid crystal panel and polarizing plates each provided on both surfaces of the liquid crystal panel, and herein, at least one of the polarizing plates may be a polarizing plate including the polarizer according to one embodiment of the present invention described above.

Herein, the types of the liquid crystal panel included in the liquid crystal display are not particularly limited. For example, known panels including panels using a passive matrix method such as a twisted nematic (TN) type, a super twisted nematic (STN) type, a ferroelectric (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display such as upper and lower substrates (ex. color filter substrate or array substrate) are not particularly limited as well, and constitutions known in the art may be employed without limit.

According to another embodiment of the present invention, the image display device may be an image display device further including a camera module provided in a depolarized area of the polarizing plate. By locating a camera module in a depolarized area in which transmittance in a visible region is enhanced and a polarization degree is relieved, an effect of enhancing visibility of the camera lens unit may be obtained.

Hereinafter, the present invention will be described in more detail with reference to examples. However, the following examples are for illustrative purposes only, and the scope of the present invention is not limited thereto.

<Example 1> Using Inkjet Method

A polyvinyl alcohol-based film (manufactured by Kuraray Co., Ltd.) was prepared and went through a swelling process for 15 seconds in purified water at 25° C., and then a dyeing process was progressed for 60 seconds in an iodine solution of 0.2 wt % concentration and 25° C. After that, a washing process was carried out for 30 seconds in a boric acid solution of 1 wt % and 45° C., and then a process of 6-time elongation was progressed in a boric acid solution of 2.5 wt % and 52° C. After the elongation, a complementary coloring process was carried out in a potassium iodide (KI) solution of 5 wt %, and the result was dried for 5 seconds in an oven at 60° C. to prepare a polarizer having a thickness of 12 μm.

A protective film was attached to one surface of the polarizer, and the opposite surface on which the protective film was not attached was partially bleached with a bleaching solution of pH 14, 50° C. and KOH 10% using an inkjet method. The bleached polarizing element was neutralized with a 3% citric acid solution to manufacture a partially bleached polarizing element. Specifically, the temperature of the KOH solution was 50° C., and the treatment period was 15 seconds, and after the manufacture, the film was washed with purified water at 20° C., and was neutralized by being immersed into a 3% citric acid solution for 10 seconds at 25° C. After the neutralization, washing with the purified water was carried out at 20° C. in order to remove the residual acid solution. In order to remove moisture remaining after the neutralization, drying was carried out by passing the polarizing element through a drying oven for 30 seconds at 50° C.

<Example 1> Using Gravure Printing Method

A polyvinyl alcohol-based film (manufactured by Kuraray Co., Ltd.) was prepared and went through a swelling process for 15 seconds in purified water at 25° C., and then a dyeing process was progressed for 60 seconds in an iodine solution of 0.2 wt % concentration and 25° C. After that, a washing process was carried out for 30 seconds in a boric acid solution of 1 wt % and 45° C., and then a process of 6-time elongation was progressed in a boric acid solution of 2.5 wt % and 52° C. After the elongation, a complementary coloring process was carried out in a potassium iodide (KI) solution of 5 wt %, and the result was dried for 5 seconds in an oven at 60° C. to prepare a polarizer having a thickness of 12 μm.

A protective film was attached to one surface of the polarizer, and the opposite surface on which the protective film was not attached was partially bleached with a bleaching solution of pH 14, 50° C., viscosity 50 cp and KOH 10% using a gravure printing method. The bleached polarizing element was neutralized with a 3% citric acid solution to manufacture a partially bleached polarizing element. Specifically, the temperature of the KOH solution was 50° C., and the treatment period was 15 seconds, and after the manufacture, the film was washed with purified water at 20° C., and was neutralized by being immersed into a 3% citric acid solution for 10 seconds at 25° C. After the neutralization, washing with the purified water was carried out at 20° C. in order to remove the residual acid solution. In order to remove moisture remaining after the neutralization, drying was carried out by passing the polarizing element through a drying oven for 30 seconds at 50° C.

Comparative Example 1

A polarizing element was manufactured in the same manner as in Example 1 except that the neutralizing step was not carried out.

Figure 6:
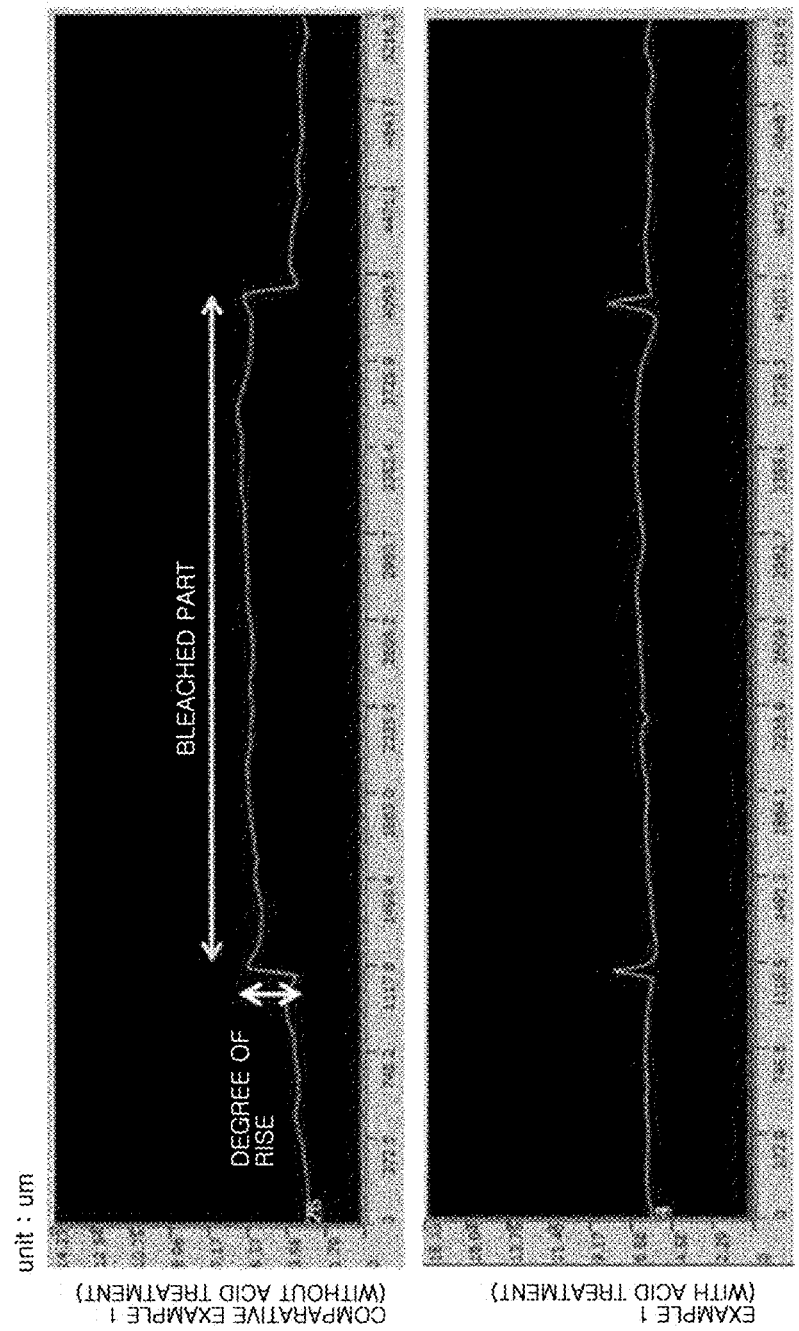
FIG. 6 and FIG. 7 are results measuring a degree of appearance deformation of partially bleached parts of a polarizing element each manufactured according to Example 1 and Comparative Example 1 using a laser microscope.
Figure 7:
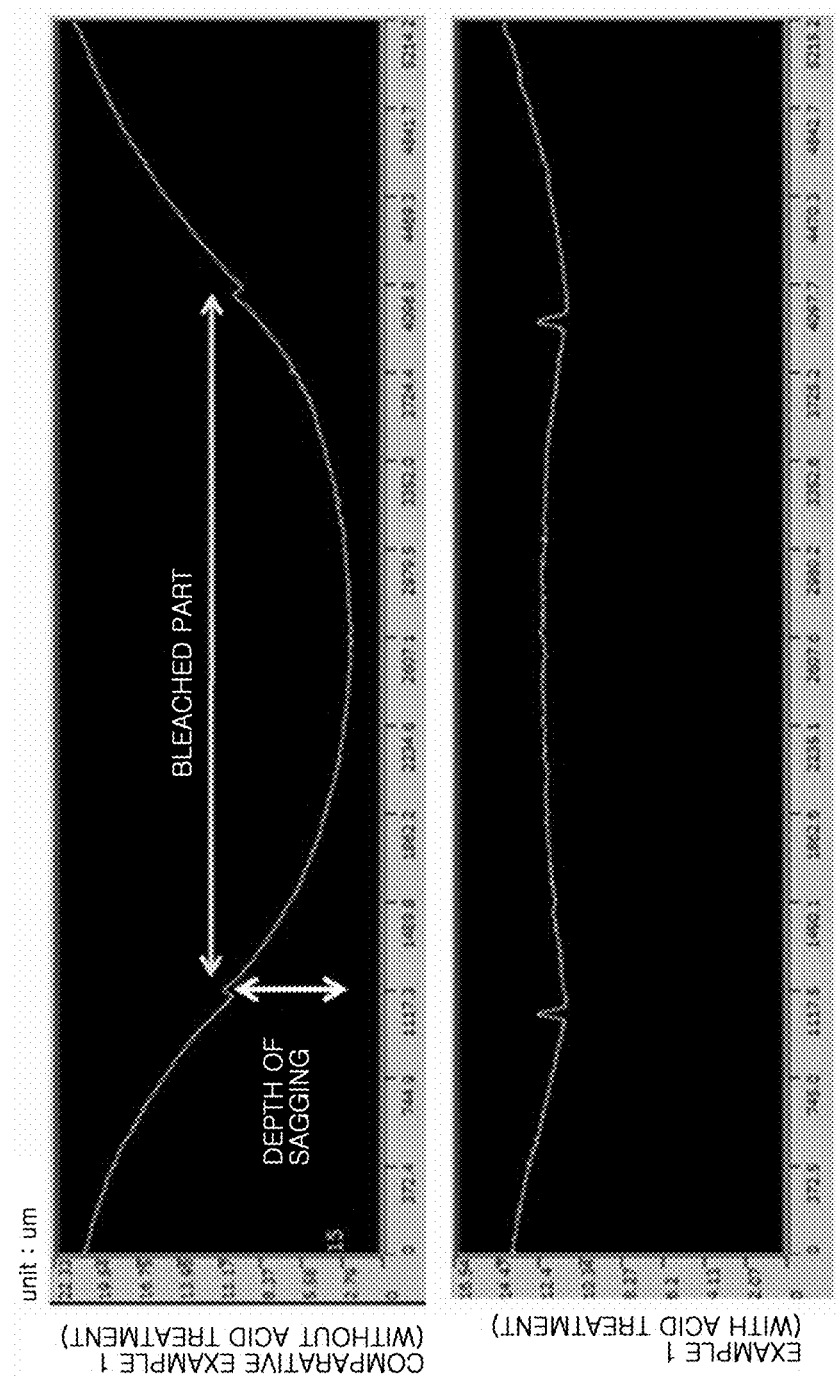

It was identified that the degree of appearance deformation in the partially bleached part of the polarizing element manufactured according to Example 1 was reduced compared to the polarizing element manufactured according to Comparative Example 1, and the results are shown in FIG. 6 and FIG. 7.

FIG. 6 is a result comparing the degree of the rise of the bleached part in Example 1 and Comparative Example 1, and specifically, is a result measuring the height of the rise of the bleached part using a laser microscope.

Meanwhile, FIG. 7 is a result comparing the degree of the sagging of the bleached part in Example 1 and Comparative Example 1, and specifically, is a result measuring the depth of the sagging of the bleached part compared to surrounding parts using a laser microscope.

Through FIG. 6 and FIG. 7, it was seen that, deformation of the polarizing element appearance was reduced by carrying out the appearance correcting step after the partially bleaching step, and as a result, dimensional stability was able to be increased, as in one embodiment of the present invention.

EXPLANATION OF REFERENCE NUMERALS AND SYMBOLS

100: Polarizing Element Roll
120: Polarizing Element
140: Partially Bleached Polarizing Element
150: Crosslinked Polarizing Element
160: Polarizing Element Including Locally Bleached Areas
170: Roll of Polarizing Element Including Locally Bleached Areas
200: Printing Device
300: Neutralizing Solution
310: Crosslinking Solution (Crosslinking Bath)
400: Washing and Drying Oven
420: Washing Roll
440: Drying Oven
460: Heating Roll
1000: VISION Equipment
2000: Laser Equipment
2100: Laser
2200: Reflection Mirror
2300: F-Theta Lens or Lens
2310: Focusing Lens
2400: Substrate
2501: Beam Expender 2502: Beam Shaper
3000: Stripping Roll
4000: Remainder Excluding Single Sheet-Type Polarizing Element
5000: Single Sheet-Type Polarizing Element

The invention claimed is:

1. A method for manufacturing a polarizing element including locally bleached areas comprising:
providing a polarizing element including a polyvinyl alcohol-based polarizer in which at least one of iodine and dichroic dye is oriented in a certain direction;
attaching a protective film to one surface of the polyvinyl alcohol-based polarizer;
partially bleaching the polarizing element by bringing a bleaching solution into contact with the surface opposite to the surface of the polyvinyl alcohol-based polarizer to which the protective film is attached through a printing method;
correcting an appearance of the partially bleached polarizing element; and
washing and drying the polarizing element after the appearance correcting step,
wherein the partially bleaching step is carried out using a method of an inkjet marking method or a gravure printing method,
wherein the step of correcting an appearance of the partially bleached polarizing element is carried out using a method of immersing the polarizing element into a neutralizing solution
wherein the neutralizing solution includes one or more neutralizing agents selected from the group consisting of sulfuric acid, citric acid and hydrochloric acid, and
wherein the locally bleached areas have single transmittance of 90% or greater in a wavelength band of 400 nm to 800 nm.

2. The method for manufacturing a polarizing element including locally bleached areas of claim 1, wherein the bleaching solution is a strong basic solution having a pH of 11 to 14.

3. The method for manufacturing a polarizing element including locally bleached areas of claim 1, wherein the bleaching solution includes one or more types of bleaching agents selected from the group consisting of sodium hydroxide (NaOH), sodium hydrosulfide (NaSH), sodium azide (NaN$_3$), potassium hydroxide (KOH), potassium hydrosulfide (KSH) and potassium thiosulfate (KS$_2$O$_3$).

4. The method for manufacturing a polarizing element including locally bleached areas of claim 3, wherein a concentration of the bleaching agent in the bleaching solution is from 1% by weight to 30% by weight.

5. The method for manufacturing a polarizing element including locally bleached areas of claim 1, wherein the bleaching solution has viscosity of 1 cps to 2000 cps.

6. The method for manufacturing a polarizing element including locally bleached areas of claim 1, wherein the drying in the washing and drying step is carried out by passing the polarizing element through a drying oven.

7. The method for manufacturing a polarizing element including locally bleached areas of claim 1, further comprising forming an optical layer on at least one surface of the polarizing element after the appearance correcting step.

8. The method for manufacturing a polarizing element including locally bleached areas of claim 7, wherein the optical layer is a protective film, a retardation film, a brightness enhancement film, a hard coating layer, an anti-reflection layer, a gluing layer, an adhesive layer or a combination thereof.

9. A method for manufacturing a roll of a polarizing element including locally bleached areas comprising winding the polarizing element including locally bleached areas formed according to the manufacturing method of claim 1.

10. A method for manufacturing a single sheet-type polarizing element comprising:
providing a polarizing element from the roll of the polarizing element including locally bleached areas manufactured according to the manufacturing method of claim 9; and
cutting the polarizing element into a single sheet form.

11. The method for manufacturing a single sheet-type polarizing element of claim 10, wherein the cutting step is carried out using a laser.

12. The method for manufacturing a single sheet-type polarizing element of claim 11, wherein the cutting step includes recognizing a location of a bleached area of the polarizing element; setting a cutting location based on the location of the bleached area; and carrying out the cutting at the cutting location using laser.

* * * * *

UNITED STATES PATENT AND TRADEMARK OFFICE
CERTIFICATE OF CORRECTION

Page 1 of 1

PATENT NO. : 10,436,960 B2
APPLICATION NO. : 15/039709
DATED : October 8, 2019
INVENTOR(S) : Beom Seok Lee et al.

It is certified that error appears in the above-identified patent and that said Letters Patent is hereby corrected as shown below:

On the Title Page

The foreign application priority data should read as below:
(30) Foreign Application Priority Data
Mar. 26, 2014 (KR) 10-2014-0035619
Mar. 26, 2014 (KR) 10-2014-0035614
Jun. 30, 2014 (KR) 10-2014-0080491

Signed and Sealed this
Fourteenth Day of January, 2020

Andrei Iancu
*Director of the United States Patent and Trademark Office*